United States Patent
Kwon et al.

(10) Patent No.: US 12,476,670 B2
(45) Date of Patent: Nov. 18, 2025

(54) NEAR FIELD COMMUNICATION DEVICE, TERMINAL DEVICE HAVING THE SAME, AND OPERATION METHOD OF THE NEAR FIELD COMMUNICATION DEVICE

(71) Applicant: SAMSUNG ELECTRONICS CO., LTD., Suwon-si (KR)

(72) Inventors: Seokyeong Kwon, Hwaseong-si (KR); Nyeongmin Kwon, Hwaseong-si (KR); Seokhyun Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 577 days.

(21) Appl. No.: 17/895,326

(22) Filed: Aug. 25, 2022

(65) Prior Publication Data

US 2023/0179256 A1 Jun. 8, 2023

(30) Foreign Application Priority Data

Dec. 3, 2021 (KR) .................. 10-2021-0172181
Feb. 23, 2022 (KR) .................. 10-2022-0023825

(51) Int. Cl.
*H04B 5/72* (2024.01)
*H04B 5/20* (2024.01)
*H04B 5/45* (2024.01)
*H04B 5/48* (2024.01)

(52) U.S. Cl.
CPC .................. *H04B 5/72* (2024.01); *H04B 5/20* (2024.01); *H04B 5/45* (2024.01); *H04B 5/48* (2024.01)

(58) Field of Classification Search
CPC ... H04B 5/72; H04B 5/48; H04B 5/20; H04B 5/45; H04B 5/77; H04W 56/0035; H04W 4/80; H04W 56/001; H04W 56/0045

USPC .......................................... 455/41.1
See application file for complete search history.

(56) References Cited

U.S. PATENT DOCUMENTS

| | | |
|---|---|---|
| 6,215,433 B1 * | 4/2001 | Sonu ............... G11B 20/1403 |
| 9,673,964 B2 | 6/2017 | Ghahramani et al. |
| 9,712,317 B2 | 7/2017 | Frantzeskakis et al. |
| 10,264,540 B2 | 4/2019 | Yu et al. |
| 10,412,626 B2 | 9/2019 | Muehlmann et al. |
| 10,574,303 B1 | 2/2020 | Hueber et al. |

(Continued)

OTHER PUBLICATIONS

Extended Search Report in European Appln. No. 22210399.6, dated Mar. 31, 2023, 8 pages.

*Primary Examiner* — Eugene Yun
(74) *Attorney, Agent, or Firm* — Fish & Richardson P.C.

(57) ABSTRACT

A near field communication (NFC) device includes a phase detector for receiving a reference clock signal, detecting a phase of the reference clock signal, outputting a generated clock signal having a frequency synchronized with the reference clock signal, and storing phase information of the generated clock signal as a first digital code. A phase delay calculator compares the phase of the generated clock signal applied from the phase detector and a reference phase to calculate a delta value while performing an active load modulation (ALM) operation and stores the delta value as a second digital code. A transmission clock signal generator reflects phase information stored as the first digital code and the second digital code to output a transmission clock signal. Accordingly, the NFC device controls the phase of the transmission clock signal applied to the antenna of the reader device to have optimal load modulation amplitude (LMA).

16 Claims, 12 Drawing Sheets

(56) References Cited

U.S. PATENT DOCUMENTS

| | | |
|---|---|---|
| 11,099,598 B2 | 8/2021 | Prouet et al. |
| 2015/0063517 A1 | 3/2015 | Verlinden et al. |
| 2016/0294398 A1 | 10/2016 | Verlinden et al. |
| 2016/0294541 A1 | 10/2016 | Van De Beek et al. |
| 2017/0163357 A1* | 6/2017 | Cordier ................ G06K 7/0095 |
| 2020/0169300 A1 | 5/2020 | Moon et al. |
| 2021/0126672 A1 | 4/2021 | Houdebine et al. |

* cited by examiner

NEAR FIELD COMMUNICATION DEVICE, TERMINAL DEVICE HAVING THE SAME, AND OPERATION METHOD OF THE NEAR FIELD COMMUNICATION DEVICE

CROSS TO REFERENCE TO RELATED APPLICATIONS

This application claims benefit of priority to Korean Patent Application Nos. 10-2021-0172181 filed on Dec. 3, 2021, in the Korean Intellectual Property Office and 10-2022-0023825 filed on Feb. 23, 2022, in the Korean Intellectual Property Office, the disclosures of which are incorporated herein by reference in their entireties.

BACKGROUND

The present disclosure relates to a near field communication (NFC) device, a terminal device having the NFC device, and an operating method of the NFC device.

Near field communication (NFC) technology is one of radio frequency identification (RFID) technologies for wirelessly recognizing information stored in a tag using radio waves and providing data communication in a non-contact manner between devices placed in a near field. An NFC device wirelessly transmitting and receiving data in both directions using the NFC technology uses a frequency of 13.56 MHz and is based on the ISO14443 standard. A data transmission speed of the NFC device is about 105 kbps to 848 kbps and fast transmission may be performed because a pairing procedure between two terminals is not required. Meanwhile, the NFC device may load-modulate data in response to a request from an external device and output the same, and the NFC device may perform active load modulation (ALM) using power to perform load modulation and/or passive load modulation (PLM) without a separate power source.

SUMMARY

An aspect of the present disclosure is to provide an NFC device capable of transmitting a transmission clock signal having optimal load modulation amplitude (LMA) to a reader device by detecting a phase delay when a transmission clock signal is reinput as a reference clock signal and using the same to control a phase of the transmission clock signal.

According to an aspect of the present disclosure, a near field communication (NFC) device includes: a phase detector configured to receive a reference clock signal, detect a phase of the reference clock signal, output a generated clock signal having frequency synchronized with the reference clock signal, and store phase information of the generated clock signal as a first digital code; a phase delay calculator configured to compare a phase of the generated clock signal applied from the phase detector with a reference phase to calculate a delta value while performing an active load modulation (ALM) operation and store the delta value as a second digital code; and a transmission clock generator configured to reflect phase information stored as the first digital code and the second digital code to output a transmission clock signal.

According to an aspect of the present disclosure, a near field communication (NFC) device includes: a phase detector configured to detect a phase of a first reference clock signal input in a first section to output a first generated clock signal having a frequency synchronized with the first reference clock signal and store a phase of the first generated clock signal and a phase of a second generated clock signal output based on a second reference clock signal input in a second section, after the first section, as a first digital code; a phase delay calculator configured to compare a phase of the second generated clock signal applied from the phase detector with a reference phase to calculate a delta value, in the second section, and to store the delta value as a second digital code; and a transmission clock generator configured to reflect phase information stored as the first digital code and the second digital code to output a transmission clock signal.

According to an aspect of the present disclosure, a terminal device includes: an antenna configured to receive a signal from an approaching reader device; a matching network configured to perform impedance matching on the signal received through the antenna to output a reference clock signal; and an NFC device including a phase detector for receiving the reference clock signal and a feedback signal and storing path delay information of the reference clock signal and the feedback signal as a first digital code; a phase delay calculator for storing additional delay information as a second digital code based on the feedback signal; and a transmission clock generator for using phase information stored as the first digital code and inputting the feedback signal to the phase detector or using phase information stored as the first digital code and the second digital code and transmitting a transmission clock signal to the reader device.

According to an aspect of the present disclosure, an operating method of an NFC device includes operations of: approaching an antenna with a reader device; detecting a phase of a reference clock signal based on a signal received from the reader device; synchronizing a frequency of the reference clock signal with a generated clock signal; converting phase delay information of the generated clock signal into a digital code; compensating by reflecting the phase delay information in a transmission clock signal using the digital code; and transmitting the transmission clock signal to a reader device.

According to an aspect of the present disclosure, an operating method of an NFC device includes operations of: approaching an antenna with a reader device; detecting a phase of a first reference clock signal based on a signal received from the reader device; synchronizing a frequency of the first reference clock signal with a first generated clock signal; outputting a first transmission clock signal based on the first generated clock signal; inputting the first transmission clock signal as a second reference clock signal; converting phase delay information of the second reference clock signal into a digital code; calculating a delta value corresponding to a difference between a phase of a second generated clock signal that is frequency-synchronized with the second reference clock signal and a reference phase; and transmitting a second transmission clock signal compensated by reflecting the phase delay information and the delta value to the reader device.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the accompanying drawings.

Figure 1:
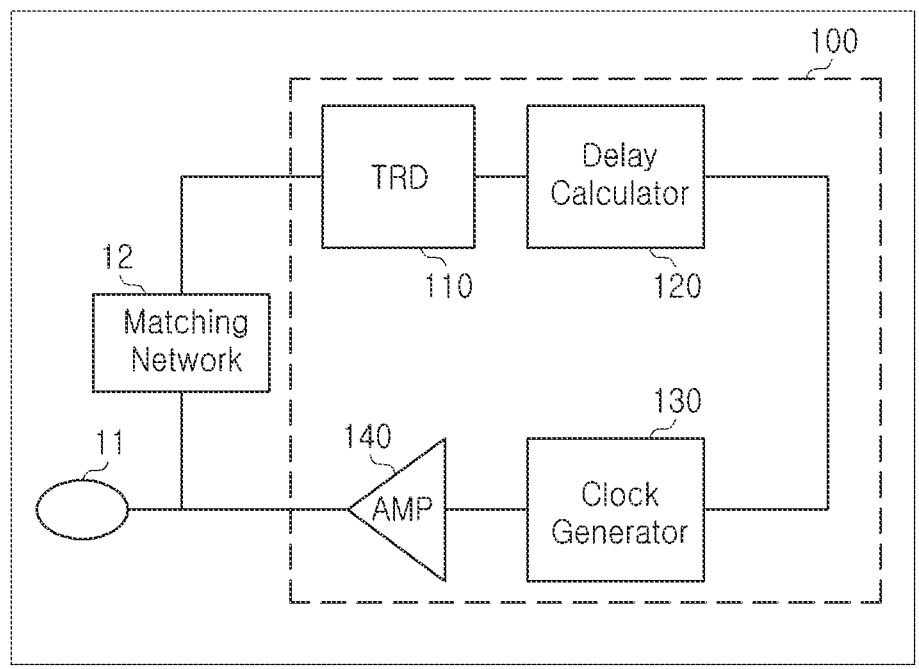
FIG. 1 is a block diagram simply illustrating an NFC device according to an example embodiment of the present disclosure.

FIG. 1 is a block diagram simply illustrating an NFC device according to an example embodiment of the present disclosure.

Referring to FIG. 1, an NFC device 100 according to an example embodiment of the present disclosure may be included in a terminal device 10 together with a terminal antenna 11 and a matching network 12. The terminal device 10 including the NFC device 100 may transmit and receive response data using a load modulation method in order to modulate an impedance in a process of receiving data from other terminal devices and/or reader devices.

The terminal device 10 may convert a received RF signal, e.g., a reference clock signal, into a received digital signal. Meanwhile, the terminal device 10 may generate a digital transmission signal based on the received digital signal and output an RF signal to be transmitted, for example, a transmission clock signal. The terminal device 10 may transmit the output transmission clock signal to other terminal devices and/or reader devices using inductive coupling in the terminal antenna 11.

The terminal device 10 including the NFC device 100 according to an example embodiment of the present disclosure may transmit data to a reader device based on an active load modulation (ALM) method in an NFC card mode. According to the active load modulation method, the terminal device 10 may include its own power supply.

The NFC device 100 according to an example embodiment of the present disclosure may determine a phase of a transmission clock signal transmitted by an active load modulation method in an NFC card mode and may control a phase delay. Meanwhile, the NFC device 100 may control the phase of the transmission clock signal in consideration of a path delay until the transmission clock signal is received again. Accordingly, the NFC device 100 may transmit a signal having optimal load modulation amplitude to a reader device irrespective of a phase change due to an external environment.

The NFC device 100 according to an example embodiment of the present disclosure may include a phase detector 110, a phase delay calculator 120, and a transmission clock generator 130. For example, the terminal antenna 11 included in the terminal device 10 together with the NFC device 100 may inductively receive a signal from an approaching reader device and the matching network 12 may output a reference clock signal by performing impedance matching on a signal received through the terminal antenna 11.

While the NFC device 100 does not perform data transmission to a reader device, the phase detector 110 may receive a reference clock signal and detect a phase of the reference clock signal to output a generated clock signal whose frequency is synchronized with a reference clock signal. In this case, the reference clock signal may be defined as a first reference clock signal and the generated clock signal may be defined as a first generated clock signal. The phase detector 110 may store phase information of the generated clock signal as a first digital code.

The transmission clock generator 130 may input a feedback signal to the phase detector 110 by reflecting the phase information stored as the first digital code. In this case, a signal output from the transmission clock generator 130 may be defined as a first transmission clock signal and a signal input to the phase detector 110 may be defined as a second reference clock signal. That is, the phase information stored as the first digital code may be reflected in the first transmission clock signal.

Meanwhile, while the NFC device 100 performs data transmission to the reader device in an active load modulation method, the phase detector 110 may receive a feedback signal. For example, the phase detector 110 may output a second generated clock signal based on the second reference clock signal. The phase detector 110 may store path delay information of the feedback signal as the first digital code.

The phase delay calculator 120 may store additional delay information as a second digital code based on a feedback signal. In this case, the additional delay information may be defined as a delta value. For example, the additional delay information may include delay information according to a matching network, impedance distribution of the NFC device 100, and coupling between the NFC device 100 and a reader device. However, this is merely an example and the present disclosure is not limited thereto. The delta value may be calculated by comparing the phase of the second generated clock signal applied from the phase detector 110 with an internally determined reference phase.

The transmission clock generator 130 may reflect phase delay information stored as the first digital code and the second digital code to output a second transmission clock signal. That is, the phase information stored as the first digital code and the second digital code may be reflected in the second transmission clock signal. The NFC device 100 may transmit the second transmission clock signal to the reader device. According to the above process, the transmission clock generator 130 may reflect the phase delay information according to the path delay in real time to output a transmission clock signal.

However, the configuration of the NFC device 100 may not be limited as described above. For example, the NFC device 100 according to an example embodiment of the present disclosure may further include a transmission clock amplifier 140 for amplifying a transmission clock signal applied from the transmission clock generator 130 and outputting the same. In addition, although not illustrated in FIG. 1, the transmission clock generator 130 may include a digital-time converter capable of converting the first digital code and the second digital code into a time domain and a voltage control oscillator for controlling an output oscillation frequency based on the input generated clock signal.

Figure 2:
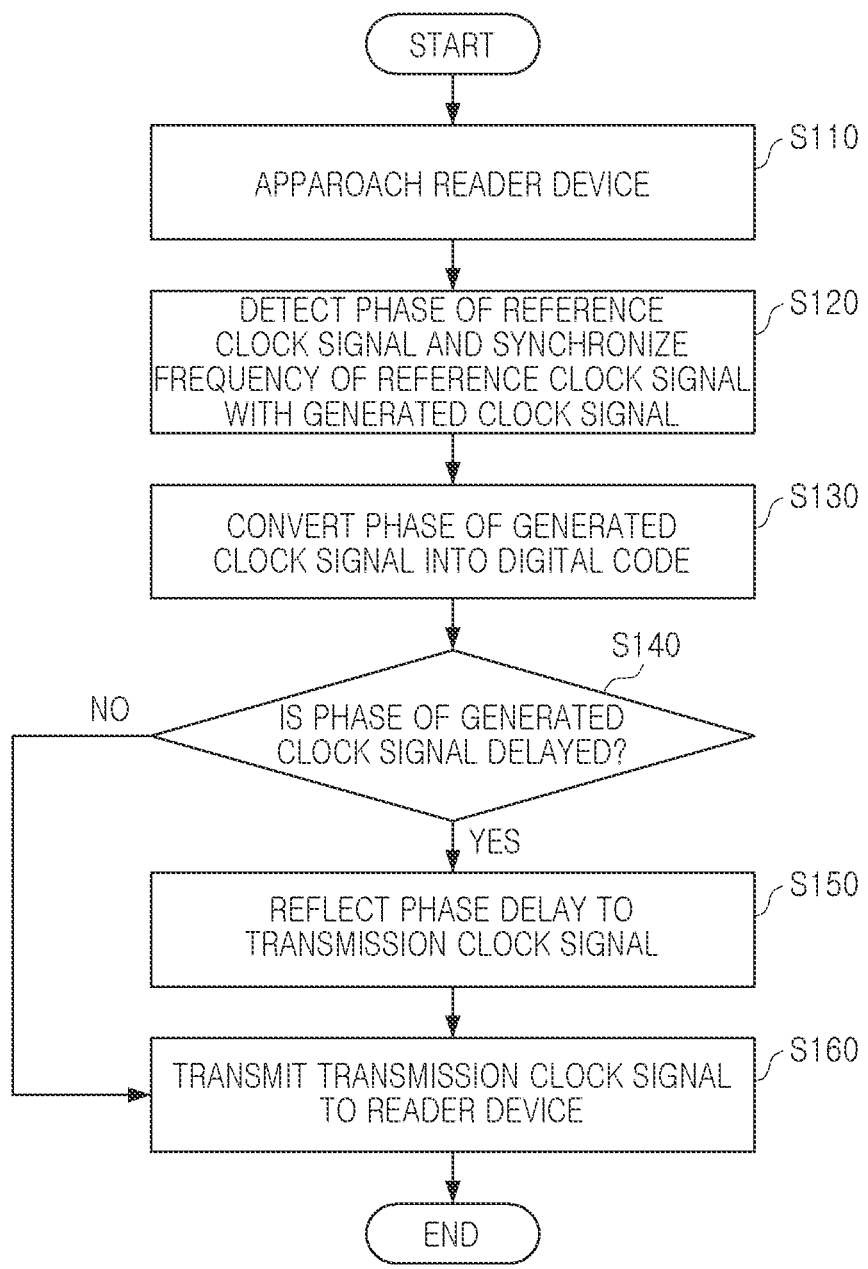
FIG. 2 is a flowchart for explaining a basic operation of an NFC device according to an example embodiment of the present disclosure.

FIG. 2 is a flowchart for illustrating a basic operation of an NFC device according to an example embodiment of the present disclosure.

Referring to FIG. 2, the NFC device 100 may control a phase of the transmission clock signal by reflecting the phase delay to the transmission clock signal. First, an operation of the NFC device 100 may be started when a reader device approaches a terminal antenna 11 (S110). For example, when a reader device including a reader antenna approaches the terminal antenna 11, coupling may occur between the two antennas and an induced reference clock signal may be input to the NFC device 100.

The phase detector 110 included in the NFC device 100 may detect a phase of an inductively input reference clock signal based on a signal received from the reader device. Meanwhile, the phase detector 110 may output a generated clock signal synchronized with a frequency of the reference clock signal (S120).

The phase detector 110 may convert phase information of the generated clock signal synchronized with the frequency of the reference clock signal into a digital code (S130). In this case, when the phase of the generated clock signal is delayed due to path delay (S140), the transmission clock generator 130 may compensate by reflecting the phase delay according to the path delay in the transmission clock signal using the stored digital code (S150) and the compensated transmission clock signal may be transmitted to the reader device (S160).

Meanwhile, when the phase of the generated clock signal is not delayed by the path delay (S140), the transmission clock generator 130 may transmit the transmission clock signal to the reader device without compensating for the transmission clock signal (S160). According to the above process, the NFC device 100 may reflect the phase delay due to the path delay until the transmission clock signal is received again in the transmission clock signal.

Figure 3:
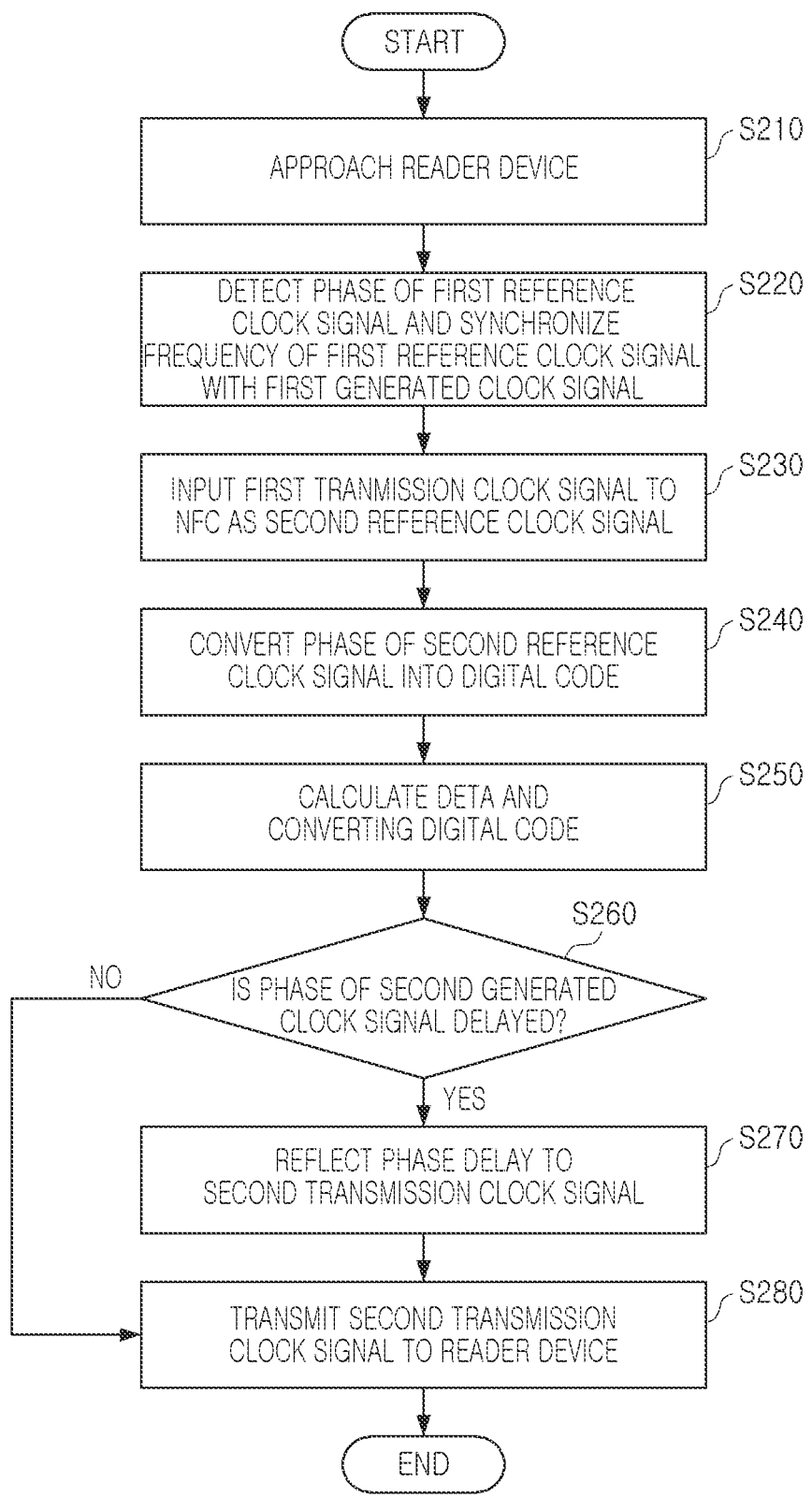
FIG. 3 is a flowchart for illustrating a delta calculation operation of an NFC device according to an example embodiment of the present disclosure.

FIG. 3 is a flowchart for illustrating a delta calculation operation of an NFC device according to an example embodiment of the present disclosure.

Referring to FIG. 3, the NFC device 100 according to an example embodiment of the present disclosure may control the phase of the transmission clock signal in consideration of additional phase delay factors as well as phase delay due to the path delay until the transmission clock signal is received again.

First, similar to the operating method of FIG. 2, an operation of the NFC device 100 may be started when a reader device approaches a terminal antenna 11 (S210). For example, when a reader device including a reader antenna approaches the terminal antenna 11, coupling may occur between the two antennas and an induced first reference clock signal may be input to the NFC device 100.

In addition, a phase detector 110 included in the NFC device 100 may detect a phase of a first reference clock signal received from the reader device. Meanwhile, the phase detector 110 may output a first generated clock signal synchronized with a frequency of a reference clock signal (S220).

According to S130 to S150 described above in the description of FIG. 2, the transmit clock generator 130 may output a first transmit clock signal based on the first generated clock signal. In the case illustrated by FIG. 3, the first transmission clock signal may not be transmitted to the reader device and may be reinput to the phase detector 110 as a second reference clock signal as a feedback signal (S230).

The phase detector 110 may convert the phase information of the input second reference clock signal into a first digital code and store the same (S240), and the phase delay calculator 120 receiving a second generated clock signal from the phase detector 110 may calculate a delta value corresponding to a difference between a phase of the second generated clock signal, which is frequency-synchronized with a reference phase that is internally determined. The calculated delta value may be converted into a second digital code and stored (S250).

In this case, when the phase of the second generated clock signal is delayed by the path delay and/or additional delay (S260), the transmission clock generator 130 may compensate by reflecting a phase delay in a second transmission clock signal using the stored first digital code and/or the second digital code (S270). That is, the NFC device 100 according to an example embodiment of the present disclosure may reflect: (1) the phase delay information due to the path delay until the transmission clock signal is received again and (2) the additional phase delay information due to additional delay factors to compensate a second transmission clock signal. The compensated second transmission clock signal may be transmitted to the reader device (S280).

Meanwhile, when the phase of the second generated clock signal is not delayed due to the path delay (S260), the transmission clock generator 130 may transmit the second transmission clock signal to the reader device without compensating for the separate transmission clock signal. According to the above process, the NFC device 100 according to an example embodiment of the present disclosure may transmit the second transmission clock signal to the reader device by controlling the phase of the second transmission clock signal to have optimal load modulation amplitude.

Figure 4:
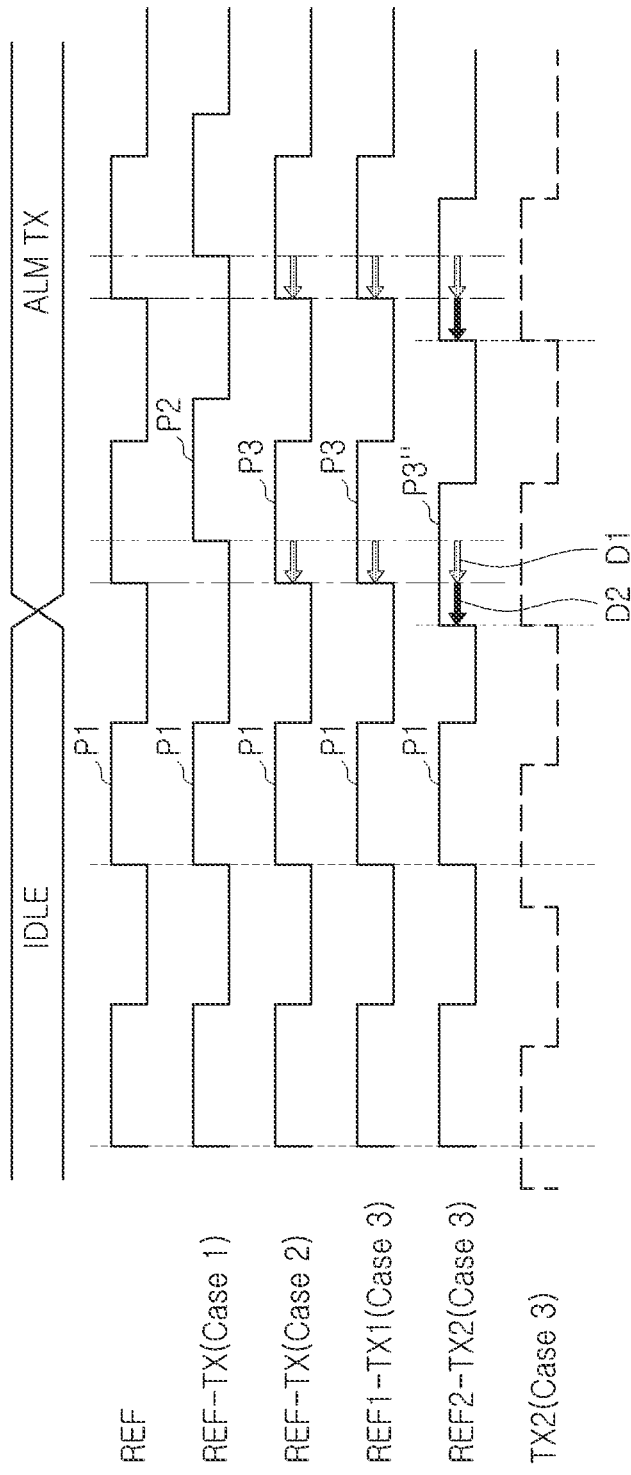
FIG. 4 is a waveform diagram of a clock signal according to an operation of an NFC device according to an example embodiment of the present disclosure.

FIG. 4 is a waveform diagram of a clock signal according to an operation of an NFC device according to an example embodiment of the present disclosure. FIGS. 5 to 8 are block diagrams illustrating an operation of the NFC device according to an example embodiment of the present disclosure from a structural point of view.

Referring to FIG. 4, signals may be transmitted in a form of clock signals in the NFC device 100 according to an example embodiment of the present disclosure. A first waveform diagram REF illustrated in FIG. 4 may illustrate a reference clock signal, and a second waveform diagram (REF-TX (Case 1)) may illustrate a transmission clock signal when a phase delay occurs due to a path delay.

Figure 6:
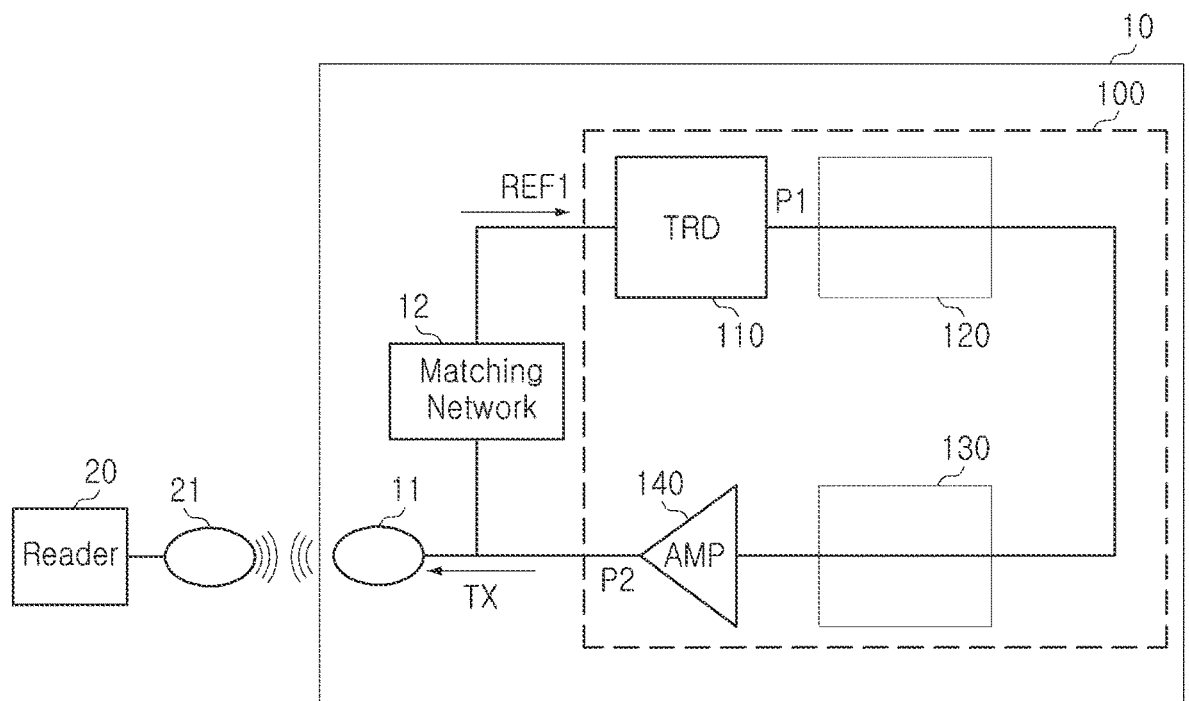

For example, the second waveform diagram REF-TX (Case 1) may illustrate a reference clock signal and a transmission clock signal in the operation of the NFC device 100 illustrated in FIG. 6. The third waveform diagram REF-TX (Case 2) may illustrate a reference clock signal and a transmission clock signal in the operation of the NFC device 100 illustrated in FIG. 7. The fourth to sixth waveform diagrams (REF1-TX1 (Case 3), REF2-TX2 (Case 3), and TX2 (Case 3)) may illustrate reference clock signals and transmission clock signals in the operation of the NFC device 100 illustrated in FIG. 8.

Figure 5:
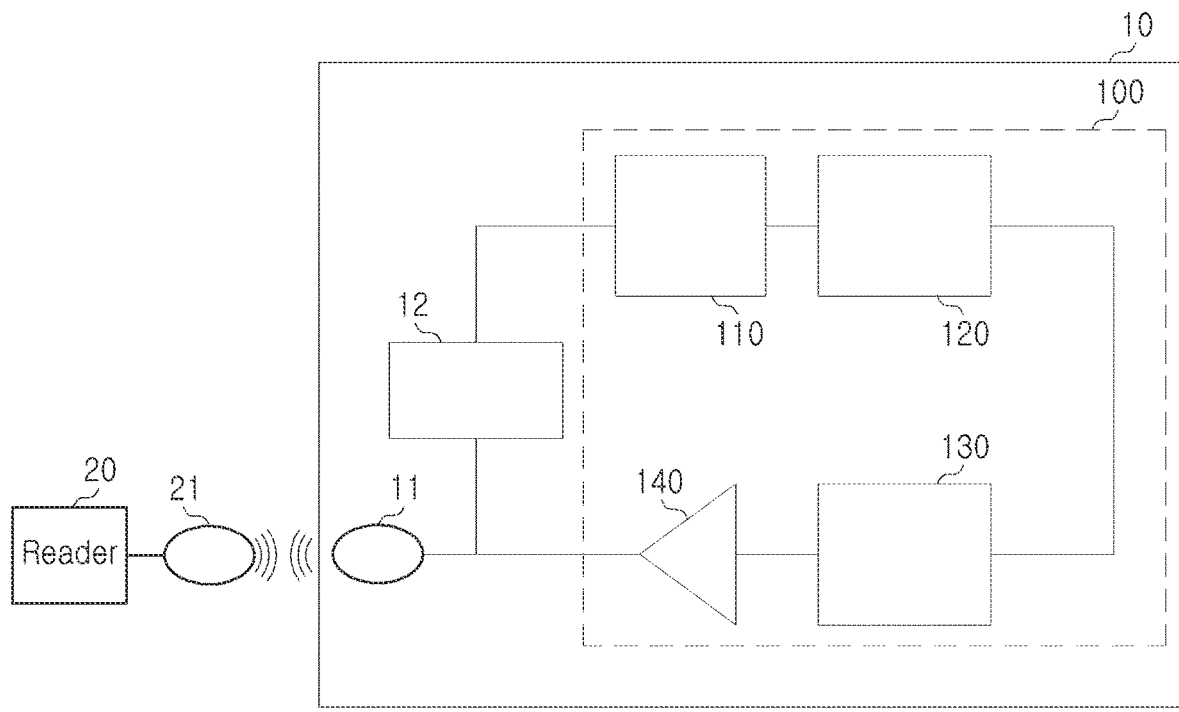
FIGS. 5 to 8 are block diagrams illustrating the operation of the NFC device according to an example embodiment of the present disclosure from a structural point of view.

Referring to FIG. 5, a terminal device 10 according to an example embodiment of the present disclosure may include a terminal antenna 11, a matching network 12, and an NFC device 100. As a reader antenna 21 of a reader device 20 approaches the terminal device 10, a reference clock signal may be induced and applied to the terminal antenna 11. Referring to FIG. 4 together with FIG. 5, as illustrated in a first waveform diagram REF, a phase of the induced reference clock signal may be P1.

Referring to FIG. 6, a reference clock signal REF may be input to the NFC device 100 included in the terminal device 10 according to an example embodiment of the present disclosure. For example, the reference clock signal REF may be input to a phase detector 110 of the NFC device 100 and the phase detector 110 outputs a generated clock signal synchronized with a frequency of the reference clock signal REF. The generated clock signal may be output from the NFC device 100 as a transmit clock signal TX through the transmit clock amplifier 140.

In a process in which the reference clock signal REF is output as the transmission clock signal TX, a delay due to a path delay may occur in the phase of the transmission clock signal TX. Referring to FIG. 4 together with FIG. 6, the transmission clock signal TX in FIG. 6 may be a signal having a phase of P2 to which separate phase compensation is not performed.

Figure 7:
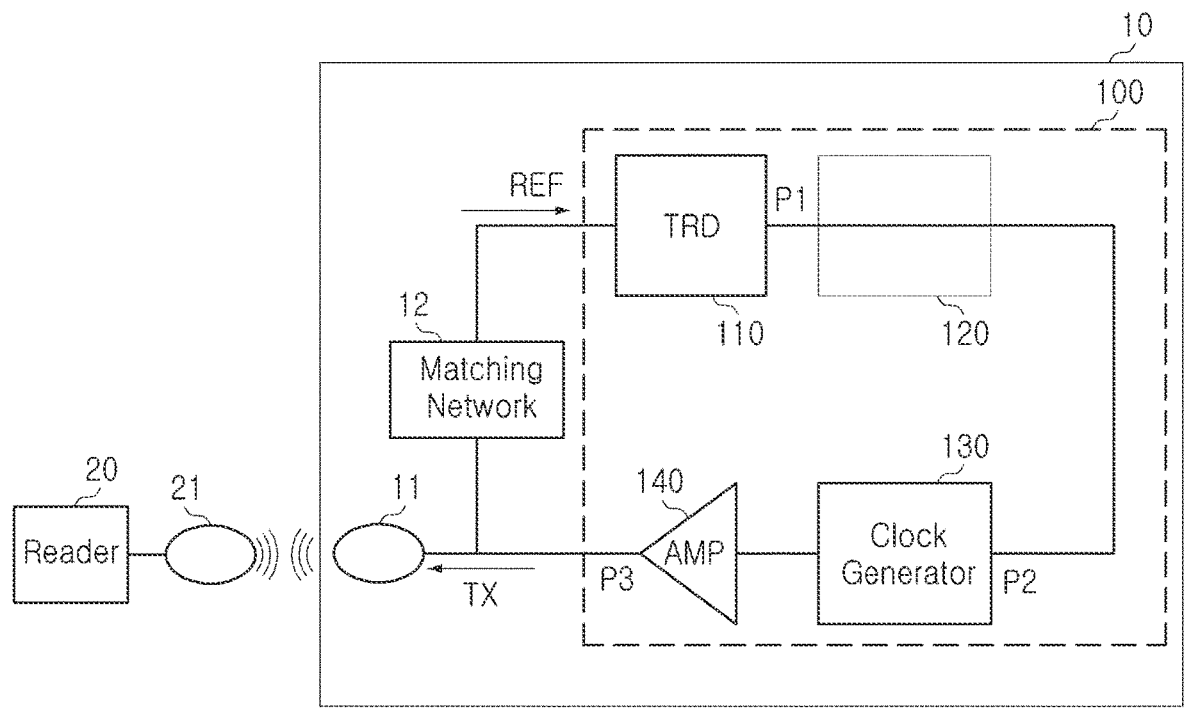

Referring to FIG. 7, a reference clock signal REF having a phase of P1 may be input to a phase detector 110 of the NFC device 100 included in the terminal device 10 according to an example embodiment of the present disclosure. The phase detector 110 may output a generated clock signal synchronized with a frequency of the reference clock signal REF and having a phase of P2

However, unlike the operation of the NFC device 100 illustrated in FIG. 6, an operation of the NFC device 100 illustrated in FIG. 7 may include a process of compensating for a phase delay of a transmission clock signal TX generated while a reference clock signal REF is output as the transmission clock signal TX. For example, the phase detector 110 may store a phase of the generated clock signal as a first digital code.

Referring also to FIG. 4, the transmission clock generator 130 may perform a first compensation D1 on the transmission clock signal TX by using the first digital code. Accordingly, the transmission clock signal TX in FIG. 7 may be a signal having a phase of P3 after the first compensation D1 is performed. In this case, the phase of P3 may be the same as P1, the phase of the reference clock signal REF. However, this is merely an example and the present disclosure is not limited thereto.

Figure 8:
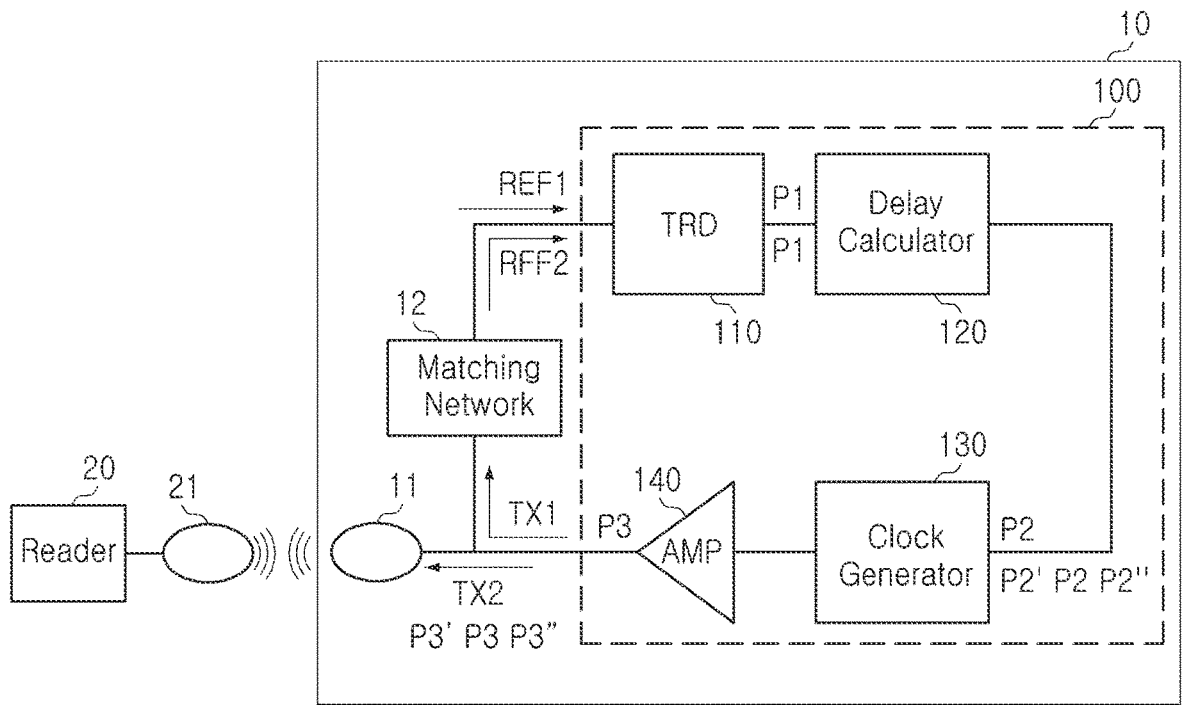

Referring to FIG. 8, the operation of the NFC device 100 included in the terminal device 10 according to an example embodiment of the present disclosure may include an operation in a first section in which transmission to the reader device 20 is not performed, and an operation in a second section in which in which signal transmission to the reader device 20 is performed.

For example, the reference clock signal input to the NFC device 100 may include a first reference clock signal REF1 input to the phase detector 110 in the first section and a second reference clock signal REF2 input to the phase detector 110 in a second section after the first section. That is, the first reference clock signal REF1 may be a signal generated by an approach of the reader device 20 and the second reference clock signal REF2 may be a signal output based on the first reference clock signal REF1.

Similarly, the transmission clock signal output from the NFC device 100 may include a first transmission clock signal TX1 output from the transmission clock generator 130 in the first section and a second transmission clock signal TX2 output from the transmission clock generator 130 in the second section. Meanwhile, the first transmission clock signal TX1 may correspond to the first transmission clock signal TX1 output based on the first reference clock signal REF1.

Accordingly, the first transmission clock signal TX1 output from the transmission clock generator 130 in the first section may not be synchronized with the reader antenna 21 of the reader device 20 and the second transmission clock signal TX2 may be synchronized with the reader antenna 21 of the reader device 20 to implement optimal load modulation amplitude.

For example, in a first section, a first reference clock signal REF1 may be input to the phase detector 110 of the NFC device 100. The phase detector 110 may output a first generated clock signal synchronized with a frequency of the first reference clock signal REF1 and having a phase of P2. In the first section, the first generated clock signal may bypass the phase delay calculator 120 and, similarly to an operation of the NFC device 100, the transmission clock generator 130 may perform the first compensation D1 to output a first transmission clock signal TX1 having a phase of P3.

Meanwhile, in a second section after the first section, the first transmission clock signal TX1 may be reinput to the NFC device 100 as a second reference clock signal REF2. For example, the second reference clock signal REF2 may be a signal having a phase of P1. The phase detector 110 may output a second generated clock signal based on the second reference clock signal REF2 and store the phase of the second generated clock signal as a first digital code.

The phase delay calculator 120 may calculate a delta value by comparing the phase of the second generated clock signal with a predetermined reference phase. The calculated delta value may be stored as a second digital code. The transmission clock generator 130 may perform a second compensation D2 reflecting the delta value together with the first compensation D1 using the first digital code and the second digital code and then output a second transmission clock signal TX2.

In FIG. 8, the phases of the first generated clock signal and the second generated clock signal may be variously represented as P2', P2, and P2" due to additional delay factors such as coupling, or the like, with the reader device 20. In the NFC device 100 according to an example embodiment of the present disclosure, when only the first compensation D1 is performed, a first transmission clock signal TX1 having a fixed phase of P3 may be output because additional delay factors are not considered. On the other hand, when the second compensation D2 is performed together with the first compensation D1, the phase of the second transmission clock signal TX2 may be variously determined as P3', P3, and P3" in consideration of additional delay factors.

Accordingly, the NFC device 100 according to an example embodiment of the present disclosure may control the phase of the transmission clock signal in consideration of all various delay factors, so that a signal having an optimal load modulation amplitude may be transmitted to the reader device 20 regardless of the phase change due to external environments.

Figure 9:
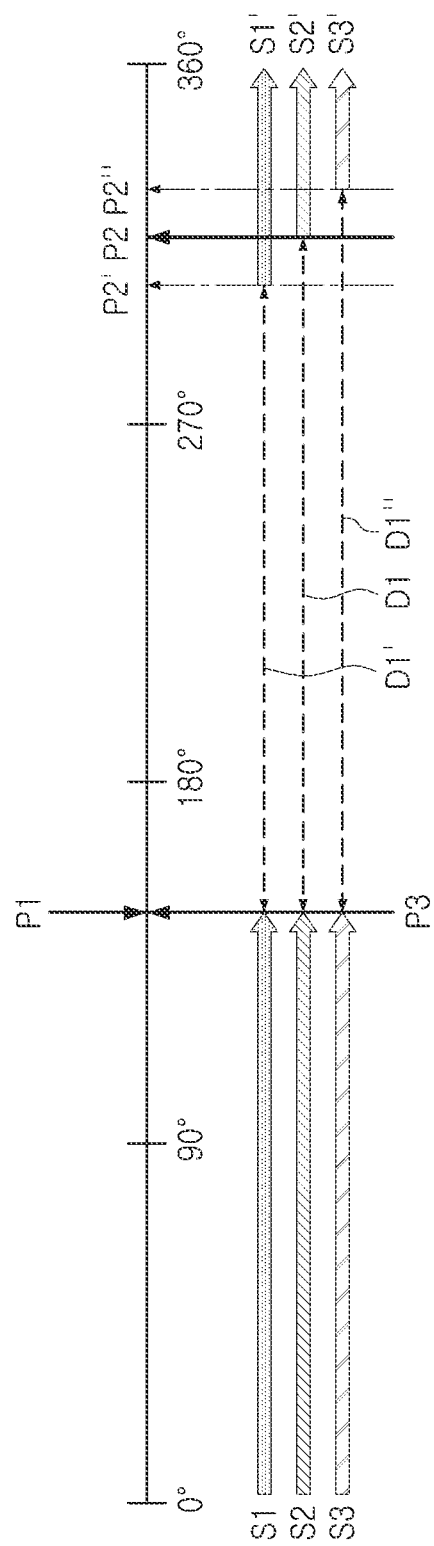
FIG. 9 is a diagram illustrating phase compensation of a transmission clock signal in the NFC device illustrated in FIG. 7.
Figure 10:
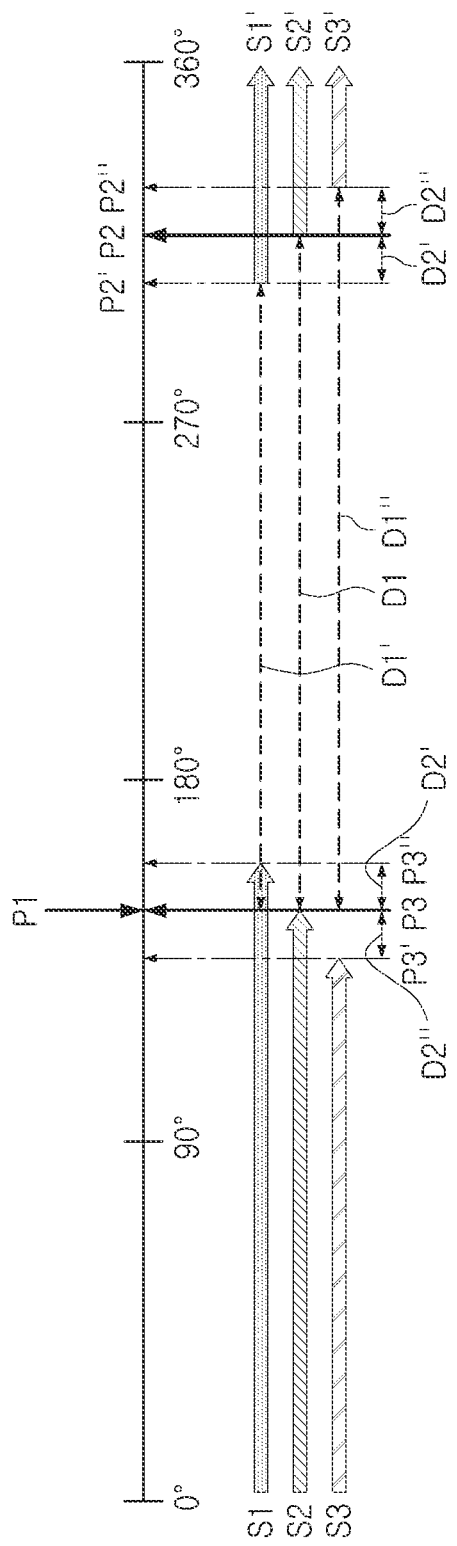
FIG. 10 is a diagram illustrating phase compensation of a transmission clock signal in the NFC device according to an example embodiment of the present disclosure shown in FIG. 8.

FIG. 9 is a diagram illustrating phase compensation of a transmission clock signal in the NFC device illustrated in FIG. 7. FIG. 10 is a view for illustrating phase compensation of a transmission clock signal in the NFC device according to an example embodiment of the present disclosure illustrated in FIG. 8.

Referring to FIGS. 7 and 9 together, a reference clock signal REF input to the NFC device 100 may have a phase of P1. Referring to FIG. 9, P1 is illustrated as having a value between 90° and 180°, but this is merely an example and the present disclosure is not limited thereto.

Meanwhile, phases of a generated clock signal output from the phase detector 110 and returning after reflecting a path delay may be P2', P2, and P2". In this case, a reference phase managed inside the NFC device 100 may be P2, but phases of the generated clock signal by additional delay elements may be expressed as P2', P2, and P2". For example, the phase of the generated clock signal may be greater than the phase of the reference clock signal. Referring to FIG. 9, P2', P2, and P2" are illustrated as having a value between 270° and 360°, but this is merely an example and the present disclosure is not limited thereto.

The transmission clock generator 130 may perform first compensations D1', D1, and D1" on the generated clock signal to which the path delay is reflected. A phase of a transmission clock signal TX output with the first compensations D1', D1, and D1" may be fixed to P3. In this case, P3 corresponding to the phase of the transmission clock signal TX may be the same as P1, corresponding to the phase of the reference clock signal REF.

Accordingly, a degree of phase change of the transmission clock signal TX due to the first compensation D1', D1, and D1" may vary according to a degree of the path delay. For example, S1, a first reference clock signal, may be input to the transmission clock generator 130 as S1' accompanied by a relatively low path delay and may be output as a transmission clock signal TX having a phase of P3 by the first compensation D1'.

Meanwhile, S2, a second reference clock signal, may be input to the transmission clock generator 130 as S2' accompanied by a general path delay and may be output as a transmission clock signal TX having a phase of P3 by the first compensation D1. S3, a third reference clock signal, may be input to the transmission clock generator 130 as S3' with a high path delay and may be output as a transmission clock signal TX having a phase of P3 by the relatively large first compensation D1".

Referring to FIGS. 8 and 10 together, a first reference clock signal REF1 input to the NFC device 100 may have a phase of P1. Meanwhile, phases of the second generated clock signal output from the phase detector 110 through the first section and the second section and returning after reflecting a path delay may be P2', P2, P2".

The transmission clock generator 130 may perform first compensation D1', D1, and D1" and second compensation D2', and D2" on the generated clock signal to which the path delay is reflected. The first compensations D1', D1, and D1" may be the same as described with reference to FIG. 9. Meanwhile, the second transmission clock signal TX2 may have various non-fixed phases of P3', P3, and P3" by the second compensations D2', D2". Accordingly, the phase of the second transmission clock signal TX2 synchronized with a reader antenna of the reader device may be different from the phase of the first reference clock signal REF1.

A magnitude of the phase compensated by the second compensations D2' and D2" may correspond to a delta value in respective signals. For example, the delta value may include a first delta value when the phase of the second generated clock signal is greater than a predetermined reference phase, a second delta value when a phase of the generated clock signal is equal to a reference phase, and a third delta value when the phase of the generated clock signal is lower than a reference phase.

When the delta value is a first delta value, a relatively large second compensation D2" may be performed on the second transmission clock signal TX2, and accordingly, a phase of the second transmission clock signal TX2 may be smaller than a phase of a first reference clock signal REF1. Meanwhile, when the delta value is a second delta value, the phase of the second transmission clock signal TX2 may be the same as the phase of the first reference clock signal REF1. When the delta value is a third delta value, a relatively small second compensation D2' may be performed on the second transmission clock signal TX2, and accordingly, the phase of the second transmission clock signal TX2 may be greater than the phase of the first reference value REF1. The second transmission clock signal TX2 compensated in the NFC device 100 according to an example embodiment of the present disclosure may allow a magnitude of the load modulation amplitude to have a maximum value.

Figure 11:
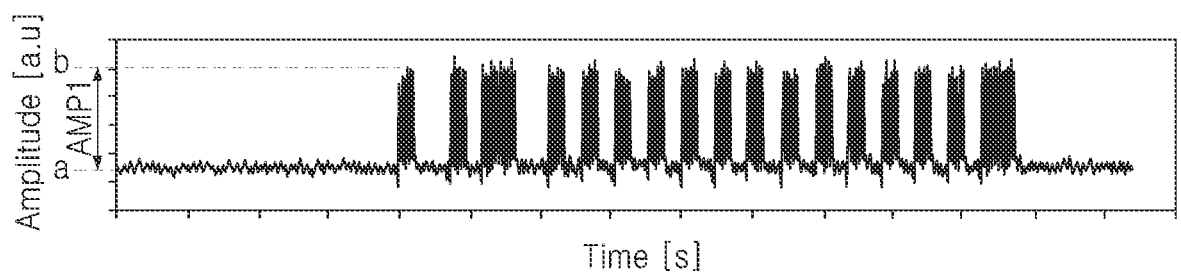
FIGS. 11 and 12 are diagrams illustrating an effect of the NFC device according to an example embodiment of the present disclosure.
Figure 12:
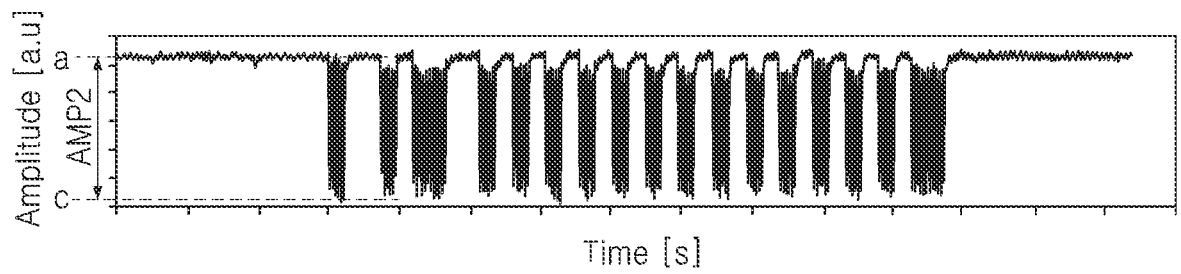

FIGS. 11 and 12 are diagrams illustrating an effect of an NFC device according to an example embodiment of the present disclosure.

Referring to FIG. 11, load modulation amplitude appearing in a general NFC device may not appear in a constant direction. FIG. 11 illustrates a load modulation amplitude appearing in a positive direction to have a magnitude of b–a, but this is merely an example and the present disclosure is not limited thereto.

Meanwhile, referring to FIG. 12, the load modulation amplitude appearing in the NFC device 100 according to an example embodiment of the present disclosure may be constantly displayed to facilitate reception of a reader antenna of a reader device regardless of external conditions. For example, as a peak-to-peak voltage of the load modulation amplitude increases and the load modulation amplitude appears constantly in a negative direction, it may be easier to receive the reader antenna. Although FIG. 12 illustrates load modulation amplitude appearing in a negative direction to have a magnitude of a–c, this is merely an example and the present disclosure is not limited thereto. In this case, the magnitude of a–c may be greater than the magnitude of b–a.

By considering the phase delay along the path delay, in the NFC device 100 according to an example embodiment of the present disclosure, a phase of a transmission clock signal may be stably controlled to have load modulation amplitude having a large peak-peak voltage and appearing constantly in a negative direction.

Figure 13:
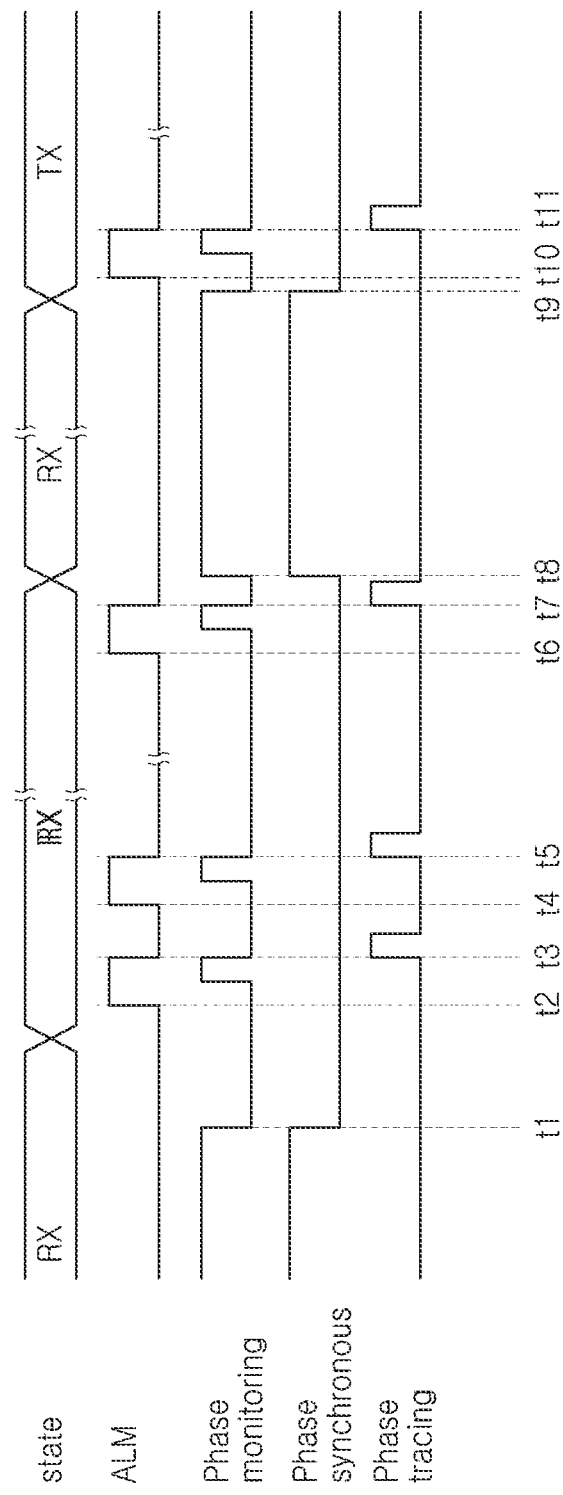
FIG. 13 is a timing diagram illustrating an operation of an NFC device according to an example embodiment of the present disclosure.

FIG. 13 is a timing diagram illustrating an operation of an NFC device according to an example embodiment of the present disclosure.

Referring to FIG. 13, the NFC device 100 according to an example embodiment may monitor a frequency and a phase of a reference clock signal in a first section RX and generate a generated clock signal synchronized to the reference clock signal. For example, before t1 and from t8 to t9, the phase detector 110 may monitor the frequency and phase of the reference clock signal and may synchronize the generated clock signal and output the same.

Meanwhile, in the second section TX, the active load modulation operation may be controlled by an active load modulation signal ALM that is periodically activated and deactivated. For example, the active load modulation signal ALM may be activated from t2 to t3, t4 to t5, t6 to t7, and t10 to t11 and may be deactivated during the remaining time period.

The phase detector 110 included in the NFC device 100 may monitor the phase of the generated clock signal during at least a portion of the time during which the active load modulation signal ALM is activated. For example, the generated clock signal monitored and stored during the second period TX may be a second generated clock signal.

The transmission clock generator 130 included in the NFC device 100 may track an optimal transmission clock signal based on the stored phase information after the active load modulation signal ALM is deactivated. Accordingly, the NFC device 100 of the present disclosure may control the phase of the transmission clock signal in real time to have optimal load modulation amplitude.

Figure 14:
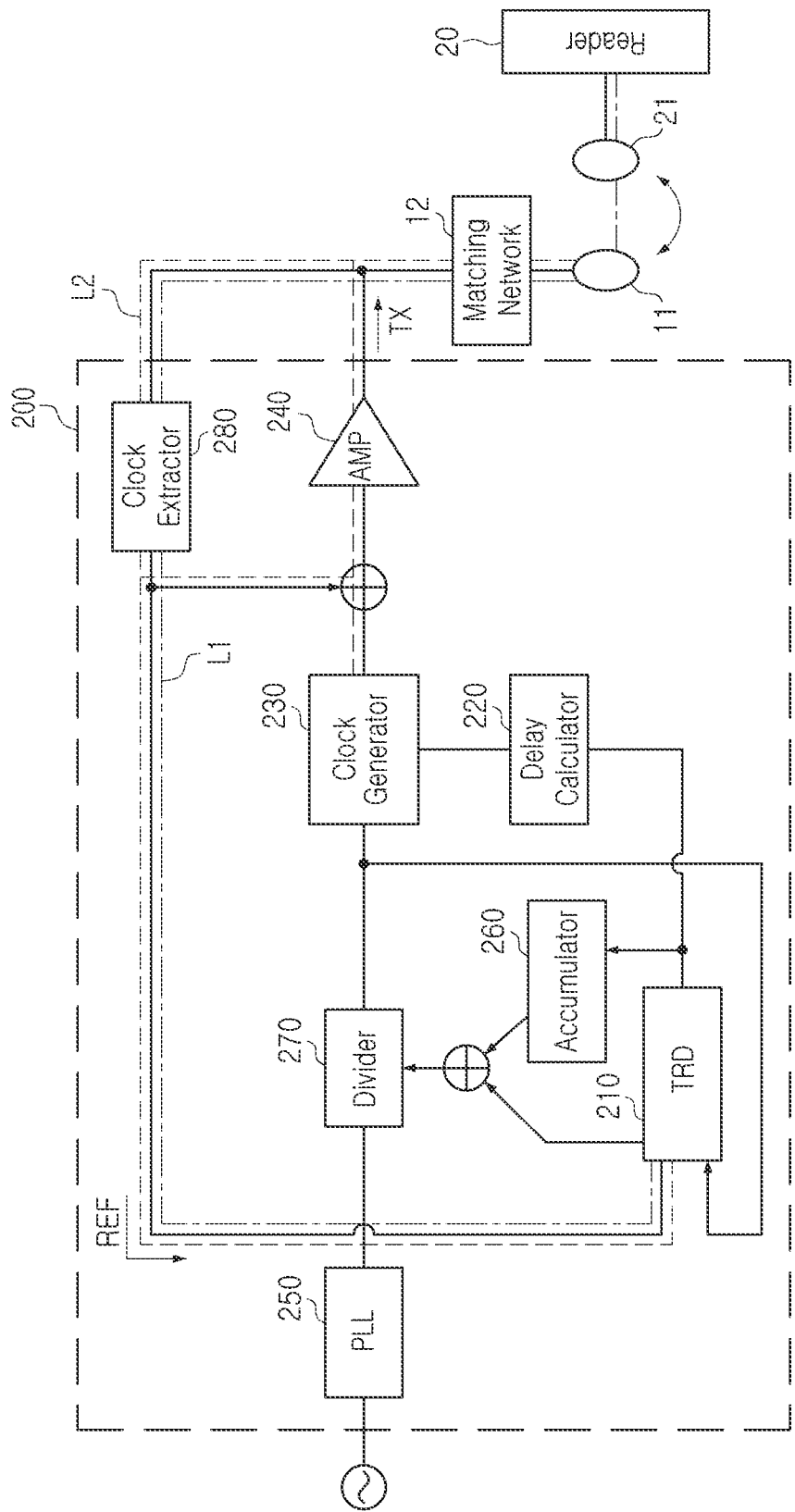
FIG. 14 is a block diagram illustrating a detailed configuration of an NFC device according to an example embodiment of the present disclosure.

FIG. 14 is a block diagram illustrating a detailed configuration of an NFC device according to an example embodiment of the present disclosure.

Referring to FIG. 14, an NFC device 200 according to an example embodiment of the present disclosure may include a phase detector 210, a phase delay calculator 220, a transmission clock generator 230, a transmission clock amplifier 240, a phase fixing loop 250, an accumulator 260, a divider 270, and a clock extractor 280.

A signal induced as the reader antenna 21 of the reader device 20 approaches the terminal antenna 11 may be impedance-matched through the matching network 12 and input to the NFC device 200 along a second path L2. The clock extractor 280 may extract a reference clock signal REF from the input signal. The extracted reference clock signal REF may be input to the phase detector 210.

Meanwhile, the phase fixing loop 250 may output the reference clock signal REF by multiplying the same. The output signal may be applied to the divider 270. The divider 270 may be controlled by the phase detector 210.

As described above, the reference clock signal REF may be input to the NFC device 200 along the second path L2 in the first section. Meanwhile, in the second section, an operation of the accumulator 260 may be stopped and the phase delay calculator 220 may operate. Accordingly, the phase delay calculator 220 may calculate a delta value using path delay information corresponding to a difference between a reference phase and an actual path delay.

Meanwhile, the transmission clock generator 230 composed of a voltage-controlled oscillator and a digital-time converter may perform a compensation for the phase delay on the generated clock signal output from the phase detector 210 using the delta value to output a transmission clock signal TX. The output transmission clock signal TX may be transmitted to the terminal antenna 11 through the transmission clock amplifier 240 and a data signal may be synchronized with a phase of the transmission clock signal TX transmitted to the terminal antenna 11.

That is, the NFC device 200 may compensate for the phase of the transmission clock signal TX in consideration of the phase delay in the first path L1 and the second path L2 and transmit the compensated transmission clock signal TX to the reader antenna 21. However, the configuration of the NFC device 200 illustrated in FIG. 14 is merely an example and the present disclosure is not limited thereto. For example, the NFC device 200 may omit some components or further include other components and may be designed to have a connection structure different from that shown.

Figure 15:
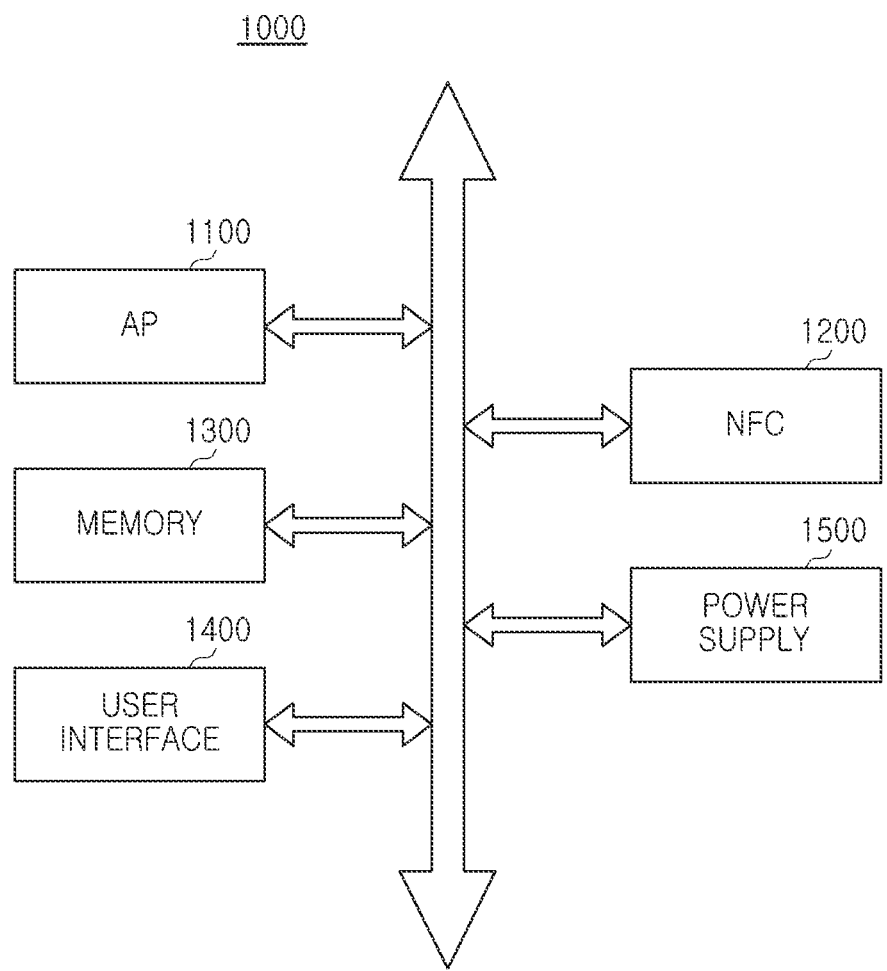
FIG. 15 is a simple block diagram illustrating an electronic system including an NFC device according to an example embodiment of the present disclosure.

FIG. 15 is a simple block diagram illustrating an electronic system including an NFC device according to an example embodiment of the present disclosure.

Referring to FIG. 15, an electronic system 1000 may include an application processor (AP) 1100, an NFC device 1200, a memory device 1300, a user interface 1400, and a power supply unit 1500. For example, the electronic system 1000 may be any mobile system, such as a cell phone, smartphone, personal digital assistant (PDA), portable multimedia player (PMP), digital camera, music player, portable game console, navigation system, laptop computer, and the like.

The application processor 1100 may control an overall operation of the electronic system 1000. The application processor 1100 may execute applications that provide an Internet browser, a game, a video, and the like. The application processor 1100 may include a single processor core or multi-processor cores. Meanwhile, the application processor 1100 may include a cache memory device temporarily storing instructions or data stored in the memory device 1300.

The memory device 1300 may store data required for an operation of the electronic system 1000. For example, the memory device 1300 may include a volatile memory device and/or a non-volatile memory device. The volatile memory device may be implemented as DRAM, SRAM, mobile DRAM, or a memory similar thereto, and the non-volatile memory device may be implemented as electrically erasable programmable read only memory (EEPROM), flash memory, phase change RAM (PRAM), resistance RAM (RRAM), Nano Floating Gate Memory (NFGM), Polymer RAM (PoRAM), Magnetic RAM (MRAM), Ferroelectric RAM (FRAM), or a memory similar thereto. For example, the memory device 1300 may store a boot image for booting the electronic system 1000 and may store output data to be transmitted to an external device and input data received therefrom.

The NFC device 1200 may transmit output data stored in the memory device 1300 to an external device through NFC communication, receive input data from the external device, and store the output data in the memory device 1300. For example, the NFC device 1200 may be the NFC devices 100 and 200 according to an example embodiment of the present disclosure described with reference to FIGS. 1 to 14. That is, the NFC device 1200 may compensate for a phase of the transmission clock signal by detecting a phase delay occurring on a transmission-reception path.

The user interface 1400 may include one or more input devices, such as a keypad, a touch screen, and/or one or more output devices, such as a speaker and a display device. The power supply 1500 may supply an operating voltage of the electronic system 1000. In addition, the electronic system 1000 may further include a camera image processor (CIS), a modem such as a baseband chipset, and the like. For example, the modem may be a modem processor that supports communication such as GSM, GPRS, WCDMA, HSxPA, and the like.

The electronic system 1000 or component thereof may be mounted using various types of packages. For example, the electronic system 1000 or components thereof may be mounted using packages such as Package on Package (POP), Ball grid arrays (BGAs), Chip Scale Packages (CSPs), Plastic Leaded Chip Carrier (PLCC), Plastic Dual In-Line Package (PDIP), Chip on Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP), and the like.

As set forth above, according to an example embodiment of the present disclosure, in an NFC device, a signal having an optimal phase modulation amplitude can be transmitted to an antenna of a reader device regardless of external conditions phase using delay on a path to control a phase of a transmission clock signal.

The various and advantageous advantages and effects of the present disclosure are not limited to the above description and may be more easily understood in the course of describing the specific embodiments of the present disclosure.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While example embodiments have been shown and described above, it will be apparent to those skilled in the art that modifications and variations could be made without departing from the scope of the present disclosure as defined by the appended claims.

What is claimed is:

1. A near field communication (NFC) device comprising:
   a phase detector configured to receive a reference clock signal, detect a phase of the reference clock signal, output a generated clock signal having a frequency synchronized with the reference clock signal, and store phase information of the generated clock signal as a first digital code;
   a phase delay calculator configured to
      compare a phase of the generated clock signal with a reference phase to calculate a delta value while performing an active load modulation (ALM) operation, wherein the delta value corresponds to a phase difference between the phase of the generated clock signal and the reference phase, and
      store the delta value as a second digital code; and
   a transmission clock generator configured to reflect phase information stored as the first digital code and the second digital code to output a transmission clock signal.

2. The NFC device of claim 1, further comprising a transmission clock amplifier configured to amplify and output the transmission clock signal.

3. The NFC device of claim 1, wherein the transmission clock generator comprises:
   a digital-time converter for converting the first digital code and the second digital code into a time domain, and
   a voltage control oscillator for controlling an output oscillation frequency based on the generated clock signal.

4. The NFC device of claim 1, wherein the reference clock signal comprises a first reference clock signal input to the phase detector in a first section and a second reference clock signal input to the phase detector in a second section, after the first section.

5. The NFC device of claim 4, wherein a first transmission clock signal based on the first reference clock signal is not transmitted to a reader device in the first section and a second transmission clock signal based on the second reference clock signal is transmitted to the reader device in the second section.

6. The NFC device of claim 4, wherein the first reference clock signal is a signal generated by an approach of a reader device and the second reference clock signal corresponds to a first transmission clock signal output based on the first reference clock signal.

7. The NFC device of claim 4, wherein the transmission clock signal comprises a first transmission clock signal output from the transmission clock generator in the first section and a second transmission clock signal output from the transmission clock generator in the second section, the second reference clock signal corresponding to a first transmission clock signal based on the first reference clock signal.

8. The NFC device of claim 7, the phase information stored as the first digital code is reflected in the first transmission clock signal.

9. The NFC device of claim 7, wherein the phase information stored as the first digital code and the second digital code is reflected in the second transmission clock signal.

10. The NFC device of claim 1, wherein a load modulation amplitude based on the transmission clock signal appears constantly in a negative direction.

11. The NFC device of claim 10, wherein the transmission clock signal allows a magnitude of the load modulation amplitude to have a maximum value.

12. The NFC device of claim 1, wherein a phase of the generated clock signal is greater than a phase of the reference clock signal.

13. The NFC device of claim 1, wherein the delta value is determined by additional delay information that includes delay information according to a matching network, impedance distribution, and coupling with a reader device.

14. The NFC device of claim 1, wherein the delta value comprises a first delta value when a phase of the generated clock signal is greater than the reference phase, a second delta value when a phase of the generated clock signal is the same as the reference phase, and a third delta value when a phase of the generated clock signal is smaller than the reference phase.

15. The NFC device of claim 1, wherein the transmission clock generator reflects phase information related to a path delay in real time to output the transmission clock signal.

16. The NFC device of claim 1, wherein a phase of the transmission clock signal synchronized to an antenna of a reader device is different from a phase of the reference clock signal.

\* \* \* \* \*